US011144277B2

(12) United States Patent
Park et al.

(10) Patent No.: US 11,144,277 B2
(45) Date of Patent: Oct. 12, 2021

(54) ELECTRONIC DEVICE FOR CONTROLLING VOLUME LEVEL OF AUDIO SIGNAL ON BASIS OF STATES OF MULTIPLE SPEAKERS

(71) Applicant: Samsung Electronics Co., Ltd., Gyeonggi-do (KR)

(72) Inventors: Youngsoo Park, Gyeonggi-do (KR); Jungyeol An, Gyeonggi-do (KR); Hyungmo Moon, Gyeonggi-do (KR); Gangyoul Kim, Gyeonggi-do (KR); Hyunmin Choi, Gyeonggi-do (KR); Jongmo Keum, Gyeonggi-do (KR); Yangsu Kim, Gyeonggi-do (KR); Namwoog Lee, Gyeonggi-do (KR); Keunwon Jang, Gyeonggi-do (KR); Seungyoon Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/765,245

(22) PCT Filed: Dec. 7, 2018

(86) PCT No.: PCT/KR2018/015462
§ 371 (c)(1),
(2) Date: May 19, 2020

(87) PCT Pub. No.: WO2019/112357
PCT Pub. Date: Jun. 13, 2019

(65) Prior Publication Data
US 2020/0348902 A1 Nov. 5, 2020

(30) Foreign Application Priority Data
Dec. 8, 2017 (KR) .................. 10-2017-0168585

(51) Int. Cl.
*H04R 3/12* (2006.01)
*G06F 3/16* (2006.01)
*H04R 3/04* (2006.01)

(52) U.S. Cl.
CPC ............... *G06F 3/165* (2013.01); *H04R 3/04* (2013.01); *H04R 3/12* (2013.01); *H04R 2430/01* (2013.01); *H04R 2499/11* (2013.01)

(58) Field of Classification Search
None
See application file for complete search history.

(56) References Cited

U.S. PATENT DOCUMENTS 9,161,126 B2   10/2015   Su et al.
9,363,599 B2   6/2016   Su et al.
(Continued)

FOREIGN PATENT DOCUMENTS

KR   10-2017-0068922 A   6/2017
WO   2015/083653 A1      6/2015
WO   WO2017164380    *   9/2017

*Primary Examiner* — James K Mooney
(74) *Attorney, Agent, or Firm* — Cha & Reiter, LLC

(57) ABSTRACT

According to various embodiments of the disclosure, an electronic device includes a first speaker, a second speaker, at least one sensor that detects a state of at least one of the first speaker and the second speaker and at least one processor electrically connected to the first speaker, the second speaker and the at least one sensor, wherein the at least one processor outputs an audio signal through the first speaker and the second speaker, identifies states of the first speaker and the second speaker by using the at least one sensor, and decreases a volume level of an audio signal output by the first speaker and increases a volume level of an audio signal output by the second speaker when it is determined that the state of the first speaker is an abnormal state. In addition, various embodiments understood from the specification are possible.

15 Claims, 8 Drawing Sheets

(56) References Cited

U.S. PATENT DOCUMENTS

| | | |
|---|---|---|
| 9,860,642 B2 | 1/2018 | Rin et al. |
| 2005/0069153 A1 | 3/2005 | Hall et al. |
| 2007/0217619 A1 | 9/2007 | Hall et al. |
| 2009/0196440 A1 | 8/2009 | Suzuki |
| 2011/0002487 A1* | 1/2011 | Panther .................. G06F 3/165 381/300 |
| 2012/0051567 A1* | 3/2012 | Castor-Perry ........ H04R 29/002 381/304 |
| 2014/0241553 A1* | 8/2014 | Tiscareno .............. H04R 5/033 381/309 |
| 2015/0065113 A1 | 3/2015 | Liu |
| 2017/0094408 A1 | 3/2017 | Napoli et al. |
| 2019/0028805 A1* | 1/2019 | Goto ...................... H04R 3/007 |

* cited by examiner

ELECTRONIC DEVICE FOR CONTROLLING VOLUME LEVEL OF AUDIO SIGNAL ON BASIS OF STATES OF MULTIPLE SPEAKERS

CROSS REFERENCE TO RELATED APPLICATIONS

This application is a National Phase Entry of PCT International Application No. PCT/KR2018/015462, which was filed on Dec. 7, 2018, and claims a priority to Korean Patent Application No. 10-2017-0168585, which was filed on Dec. 8, 2017, the contents of which are incorporated herein by reference.

TECHNICAL FIELD

Various embodiments disclosed herein relate to an electronic device including a plurality of speakers.

BACKGROUND ART

With the development of information technology (IT), various types of electronic devices, such as smart phones and tablet personal computers (PCs), have been widely used.

The electronic devices may include speakers. In recent years, the electronic device may include a plurality of speakers arranged at appropriate positions to provide a richer sound to a user. The plurality of speakers may output the same sound source in different directions to provide a user with a sound source having a sound quality above a specified quality or a volume level above a specified intensity wherever the user is located.

DISCLOSURE

Technical Problem

When the user uses the electronic device, the speaker may suffer from the risk of damage due to various causes. For example, instantaneous overcurrent may flow through the speaker, and the speaker may be damaged due to overheating due to the overcurrent. When the volume level of the speaker is decreased to prevent the risk of damage to the speaker, a sound source having a sound quality less than a specified quality or a volume level less than a specified intensity may be provided to the user. Particularly, in an electronic device including a plurality of speakers, audio signals output from the speakers may have different frequency characteristics. In this case, when the volume levels of the audio signals output from some speakers are decreased, the overall balance of sound transferred to the user may be biased to one frequency band. Accordingly, the sound source may be transferred to a listener in a different manner from what is originally intended by the sound source provider, and the user may feel uncomfortable in using the electronic device.

Various embodiments disclosed herein are intended to provide an electronic device for solving the above-described problems and the problems raised in the disclosure.

Technical Solution

According to an embodiment, an electronic device may include a first speaker, a second speaker, at least one sensor that detects a state of at least one of the first speaker and the second speaker and at least one processor electrically connected to the first speaker, the second speaker and the at least one sensor.

According to an embodiment, the at least one processor may output an audio signal through the first speaker and the second speaker, identify states of the first speaker and the second speaker by using the at least one sensor, and decrease a volume level of an audio signal output by the first speaker and increase a volume level of an audio signal output by the second speaker when it is determined that the state of the first speaker is an abnormal state.

Advantageous Effects

According to various embodiments disclosed herein, a sound source provider may provide the sound source to the user in the manner originally intended by the sound source provider, and the user's listening environment may be maintained at a specified level or more, thus reducing the user's inconvenience. In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
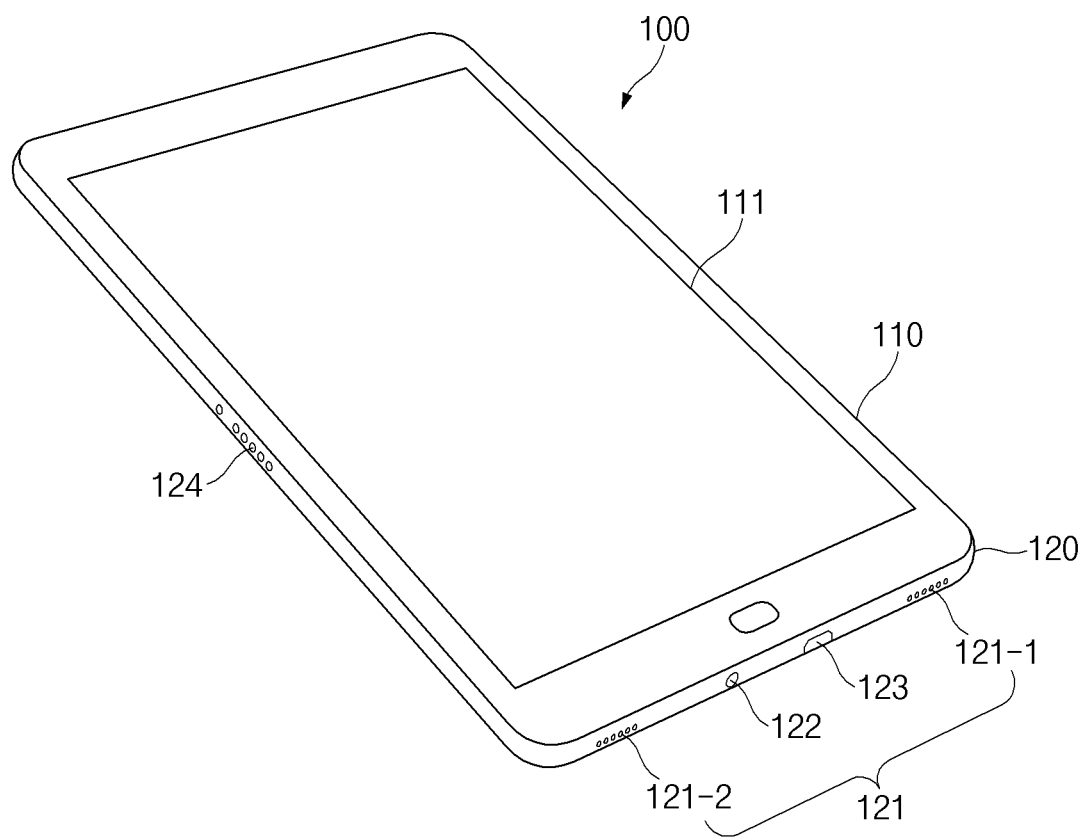
FIG. 1 illustrates an electronic device including a plurality of speakers, according to an embodiment.

FIG. 1 illustrates an electronic device including a plurality of speakers, according to an embodiment.

Referring to FIG. 1, an electronic device 100 (e.g., an electronic device 701 of FIG. 7) may include a housing. In one embodiment, the housing may include a front cover 110, a rear cover facing the front cover 110 (not shown), and a side member 120 surrounding a space between the front cover 110 and the rear cover. According to various embodiments, the front cover 110 or the rear cover may include the side member 120 as a part. For example, the rear cover may form the housing in such a manner that a portion (e.g., an edge portion) thereof is bent in the direction of the front cover 110 and attached to the front cover 110. In this case, it may be understood that the rear cover includes the side member 120 as an integral body.

Figure 7:
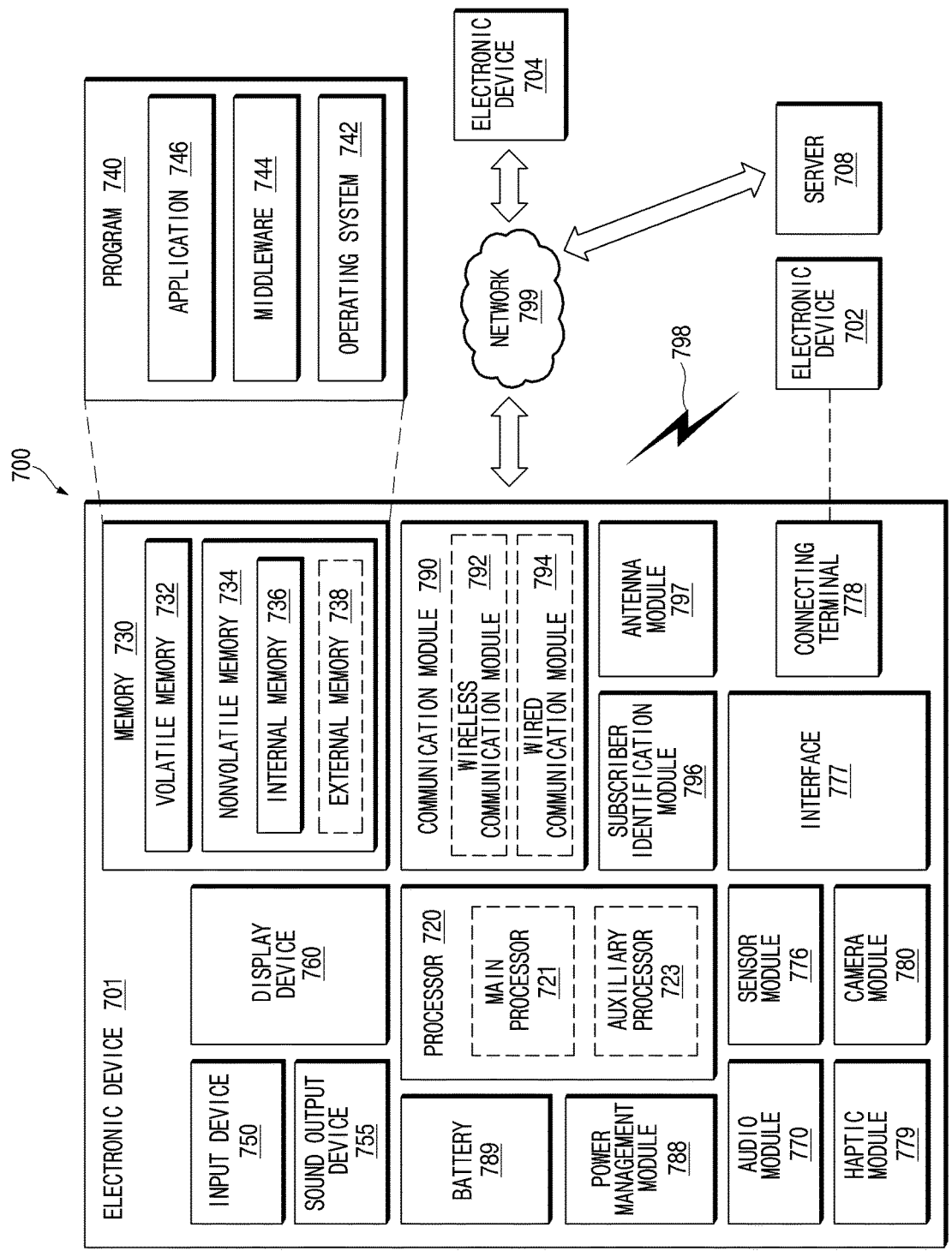
FIG. 7 is a block diagram of an electronic device in a network environment according to various embodiments.

According to one embodiment, the front cover 110 may transmit light generated by a display 111 (e.g., a display device 760 of FIG. 7). As another example, a user may provide a touch input (including a contact using an electronic pen) to the electronic device 100 by touching the front cover 110 with a part of a body (e.g., a finger). The front cover 110 may be formed of, for example, tempered glass, reinforced plastic, or a flexible polymer material, to protect the display 111 and the components included in the electronic device 100 from external impact.

According to an embodiment, the display 111 may be disposed inside a space between the front cover 110 and the rear cover. The display 111 may be disposed under or coupled to the front cover 110, for example, and exposed to the outside through at least a portion of the front cover 110. The display 111 may output content (e.g., text, images, videos, icons, widgets, or symbols, or the like) or receive an input (e.g., touch input or electronic pen input) from a user.

According to one embodiment, the side member 120 of the electronic device 100 may include a plurality of openings 121, a sound input/output terminal 122 (e.g., an input device 750 of FIG. 7), a connecting terminal 123 (e.g., a connecting terminal 778 of FIG. 7), and/or an input terminal 124. According to various embodiments, the side member 120 may be implemented as a part of the front cover 110 or the rear cover, and in this case, it may be understood that the components 121, 122, 123, and/or 124 may be included in the front cover 110 or the rear cover.

According to an embodiment, the plurality of openings 121 may be passages of a sound source output from a plurality of speakers (not shown) included in the electronic device 100 (e.g., a sound output device 755 of FIG. 7). According to an embodiment, the electronic device 100 may reproduce various types of sound sources and output the sound sources through the plurality of speakers. According to an embodiment, the plurality of speakers may be disposed inside the housing of the electronic device 100 to output the sound source output through the plurality of openings 121 to the outside of the electronic device 100. According to another embodiment, the plurality of speakers may be implemented as a part of the side member 120 of the electronic device 100.

According to various embodiments, the plurality of openings 121 or the plurality of speakers may be disposed at appropriate locations in the electronic device 100. For example, a first opening 121-1 of the plurality of openings 121 may be disposed at the right end of a lower end of the electronic device 100, and a second opening 121-2 of the plurality of openings 121 may be disposed at the left end of the lower end of the electronic device 100. For another example, the first speaker and the second speaker of the plurality of speakers are disposed respectively on the left and right sides of an upper end of the electronic device 100, and a third speaker and a fourth speaker of the plurality of speakers may be disposed respectively on the left and right sides of the lower end of the electronic device 100. The plurality of openings 121 or the plurality of speakers may be disposed at appropriate locations of the electronic device 100 as described above to improve the user's listening environment.

According to an embodiment, the sound input/output terminal 122 may be a terminal connecting the electronic device 100 and an external output device, for example, an earphone or a headset. In one embodiment, when the earphone or headset is connected to the sound input/output terminal 122, the user may listen to a sound source output by the electronic device 100 through the earphone or headset. According to one embodiment, the headset may include a microphone. The user may provide an input signal to the electronic device 100 through the microphone of the headset connected to the sound input/output terminal 122.

According to an embodiment, the connecting terminal 123 may be a connecting terminal for connection with an external device. According to various embodiments, the external device may include at least one of a charging device, an output device, and a storage device. In one embodiment, the connecting terminal 123 may be connected to a charging device, and a battery of the electronic device 100 may be electrically charged. In another embodiment, the connecting terminal 123 may be connected to an output device, and an image or sound of the electronic device 100 may be output through the output device. According to various embodiments, the connection with the external device may be established with various connecting terminals such as an HDMI connection, a USB connector, or a USB audio connector (Digital Audio interface).

According to an embodiment, the input terminal 124 may be a connecting terminal for connecting the electronic device 100 and an external input device, such as a keyboard. In one embodiment, when a keyboard is connected to the input terminal 124, a user may input a signal to the electronic device 100 through input to the keyboard. For example, the user may input text to the electronic device 100 through the keyboard. The electronic device 100 may output the input text to the display 111.

Hereinafter, the electronic device 100 including a plurality of speakers and a method for providing a sound source to a user in the electronic device 100 will be described. In the disclosure, the contents described with reference to FIG. 1 may be identically applied with respect to components having the same reference numerals as the electronic device 100 illustrated in FIG. 1.

Figure 2:
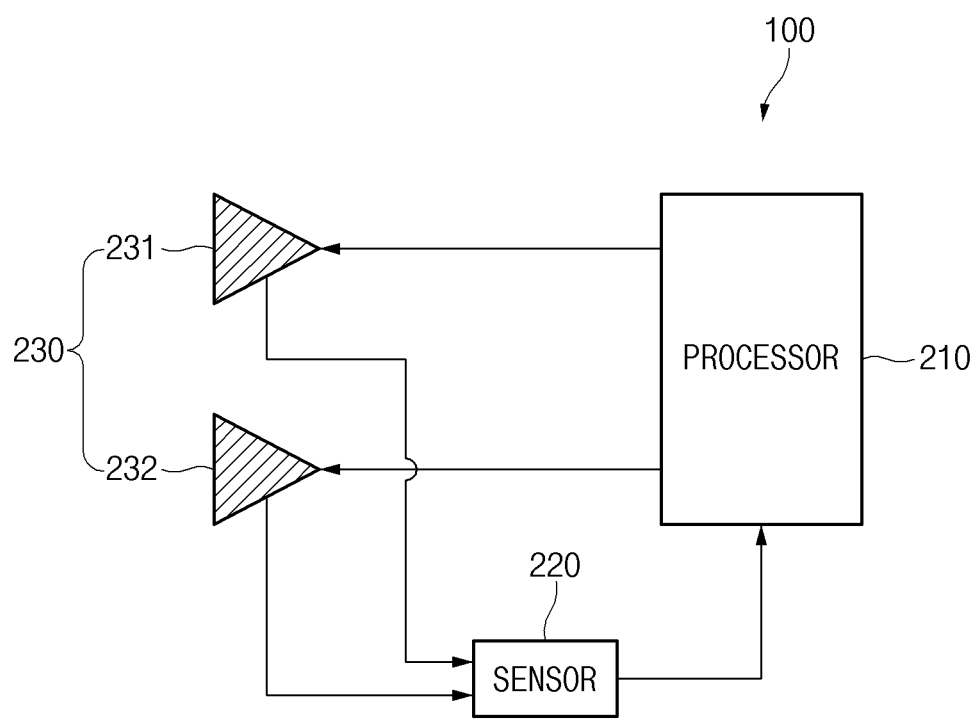
FIG. 2 illustrates a block diagram of an electronic device including a plurality of speakers, according to an embodiment.

FIG. 2 illustrates a block diagram of an electronic device including a plurality of speakers, according to an embodiment.

Referring to FIG. 2, the electronic device 100 may include a processor 210 (e.g., a processor 720 of FIG. 7), a sensor 220, a first speaker 231, and a second speaker 232. According to various embodiments, some of the components 210, 220, 231, and 232 of the electronic device 100 may be omitted or components which are not illustrated may be further included. For example, the electronic device 100 may further include a third speaker and/or a fourth speaker. For another example, the electronic device 100 may further include a communication module, or may receive a sound source from an external network through the communication module.

The first speaker 231 and the second speaker 232 may convert an electrical signal received from the processor 210 into a sound wave and output the sound wave to the outside of the electronic device 100. For example, a speaker 230 may generate a sound wave signal by vibrating a diaphragm at a specific frequency according to the electrical signal. In various embodiments, the electrical signal may include an audio signal obtained by decoding audio data of various formats such as "*.mp3", "*.wav", or "*.flac".

The sensor 220 may detect a state of the speaker 230 for at least one of the first speaker 231 and the second speaker 232. The state of the speaker 230 may include at least one of a voltage of a specific node, a current flowing through a specific node, an impedance, and a temperature, for example. For example, the sensor 220 may detect an intensity of a voltage and an intensity of a current at a specific node of the speaker 230. Through this, an impedance value of the speaker 230 may be detected, and a temperature of the speaker 230 may be estimated through the impedance value. For another example, the sensor 220 may directly detect the temperature of the speaker 230.

According to an embodiment, the sensor 220 may include a plurality of sensors. For example, the sensor 220 may include a first sensor and a second sensor, the first sensor may detect a state of the first speaker 231, and the second sensor may detect a state of the second speaker 232. In various embodiments, the number of sensors 220 may correspond to the number of speakers.

According to an embodiment, the sensor 220 may transfer the detected state of the speaker 230 (e.g., temperature or impedance) to the processor 210. According to an embodiment, the sensor 220 may detect the state of the speaker 230 at a specified time interval and transfer the state of the speaker 230 to the processor 210. In one embodiment, the specified time interval may be changed based on a volume level of the speaker 230. For example, when the volume level of the speaker 230 is less than or equal to a specified level, the state of the speaker 230 may be detected at a longer time interval and detection results may be transferred to the processor 210 because the risk of damage to the speaker 230 due to overheating is relatively low. As another example, when the volume level of the speaker 230 exceeds the specified level, the state of the speaker 230 may be detected at a shorter time interval and detection results may be transferred to the processor 210 because the risk of damage to the speaker 230 due to overheating is relatively high.

The processor 210 may be electrically connected to the sensor 220, the first speaker 231, and the second speaker 232 included in the electronic device 100. The processor 210 may execute calculation or data processing related to control and/or communication of components included in the electronic device 100.

According to an embodiment, the processor 210 may adjust a volume level of an audio signal output from the first speaker 231 and/or the second speaker 232. For example, the processor 210 may continuously or discretely increase or decrease the volume level of the audio signal output from the first speaker 231 and/or the second speaker 232.

According to an embodiment, the processor 210 may increase or decrease the volume level of the audio signal output from the first speaker 231 and/or the second speaker 232 at the same ratio in all frequency bands.

According to an embodiment, the processor 210 may differently adjust the volume level of the audio signal output from the first speaker 231 and/or the second speaker 232 according to frequency bands. For example, the processor 210 may relatively increase the volume level of a first audio signal output from the first speaker 231 in a low frequency band and relatively decrease the volume level in a high frequency band. In this case, the first audio signal may be output while a low-pitched portion is being emphasized compared to an original sound source. For another example, the processor 210 may relatively decrease the volume level of the second audio signal output from the second speaker 232 in the low frequency band and relatively increase the volume level of the second audio signal in the high frequency band. In this case, the second audio signal may be output while the high-pitched portion is being emphasized compared to the original sound source. According to an embodiment, the low frequency band may be about 20 Hz to 500 Hz, and the high frequency band may be about 2000 Hz to 20000 Hz. However, the categorization of the frequency band may be defined differently from what is presented in the above example.

According to various embodiments, the processor 210 may divide the frequency band into a plurality of regions and relatively increase or decrease a volume level in a frequency band corresponding to each region. Through this, the electronic device 100 may output various audio signals in which a specific frequency band is emphasized for one sound source.

According to an embodiment, the processor 210 may transfer the audio signal with the adjusted volume level to the first speaker 231 and the second speaker 232. In one embodiment, the processor 210 may transfer audio signals having different volume levels to the first speaker 231 and the second speaker 232 individually. For example, the processor 210 may transfer an audio signal having a relatively high volume level to the first speaker 231 and an audio signal having a relatively low volume level to the second speaker 232. For another example, the processor 210 may transfer an audio signal having a relatively high volume level in the low frequency band to the first speaker 231, and transfer an audio signal having a relatively high volume level in the high frequency band to the second speaker 232.

According to one embodiment, the processor 210 may detect states of the first speaker 231 and the second speaker 232 and determine whether the states of the first speaker 231 and the second speaker 232 are normal. For example, it may be determined whether the states of the first speaker 231 and the second speaker 232 are normal based on whether measured values (e.g., temperature, impedance, intensity of voltage, or intensity of current) of the first speaker 231 and the second speaker 232 received from the sensor 220 are within a specified range. In one embodiment, when a temperature of the first speaker 231 measured by the sensor 220 exceeds a specified threshold value, the processor 210 may determine the state of the first speaker 231 as an abnormal state. In another embodiment, when an impedance of the second speaker 232 measured by the sensor 220 is greater than or equal to a specified threshold value, the processor 210 may determine the state of the second speaker 232 as an abnormal state.

According to an embodiment, when at least one speaker 230 of the first speaker 231 and the second speaker 232 is determined to be in an abnormal state, the processor 210 may decrease the volume level of the audio signal output by the speaker 230 which is in an abnormal state and increase the volume level of the audio signal output by the speaker 230 which is in a normal state. For example, when the temperature of the first speaker 231 detected by the sensor 220 exceeds a specified value, the processor 210 may decrease the volume level of the audio signal output by the first speaker 231, and increase the volume level of the audio signal output by the second speaker 232. Through this, a difference between the sound the user hears before adjusting the volume level and the sound the user hears after adjusting may be minimized.

According to an embodiment, a frequency characteristic of the audio signal output from the first speaker 231 and a frequency characteristic of the audio signal output from the second speaker 232 may be different from each other. For example, the first speaker 231 may output a first audio signal having a first frequency characteristic, and the second speaker 232 may output a second audio signal having a second frequency characteristic. In this case, when the state of the first speaker 231 is determined to be in an abnormal state, the processor 210 may decrease the volume level of the first audio signal, and increase the volume level of the second audio signal based on the first frequency characteristic of the first audio signal having the decreased volume level.

In one embodiment, the first frequency characteristic may represent that an intensity of a signal in the low frequency band is relatively greater than an intensity of a signal in the high frequency band. In this case, when the first audio signal is decreased at the same ratio in all frequency bands, the intensity of the signal in the low frequency band may have a greater decrease compared to an intensity of the signal in the high frequency band. Therefore, the processor 210 may increase the volume level of the second audio signal by assigning a greater weight to the low frequency band than the high frequency band, thus minimizing a difference between sounds the user hears before and after adjustment.

In another embodiment, the first frequency characteristic may represent that the intensity of the signal in the high frequency band is relatively greater than the intensity of the signal in the low frequency band. In this case, when the first audio signal is decreased at the same ratio in all frequency bands, the intensity of the signal in the high frequency band may have a greater decrease compared to the intensity of the signal in the low frequency band. Accordingly, the processor 210 may increase the volume level of the second audio signal by assigning a greater weight to the high frequency band than the low frequency band, thus minimizing a difference between sounds the user hears before and after adjustment.

According to an embodiment, when adjusting the volume of the audio signal, the processor 210 may predict the risk that the state of the at least one speaker 230 becomes an abnormal state due to an audio signal with the adjusted volume level. For example, when the processor 210 increases the volume level of the second audio signal, the processor 210 may determine whether there is a high risk that the state of the second speaker 232 becomes an abnormal state due to the second audio signal having the increased volume level.

In one embodiment, the processor 210 may decrease a volume level of the audio signal output by the first speaker 231 and maintain the volume level of the audio signal output by the second speaker 232 when the state of the second speaker 232 is determined to be an abnormal state in the case of increasing the volume level of the audio signal output by the second speaker 232 although the state of the first speaker 231 is determined to be in an abnormal state. In one embodiment, the processor 210 may decrease a volume level of the audio signal output by the first speaker 231 and increase the volume level of the audio signal output by the second speaker 232 when the state of the second speaker 232 is determined to be a normal state although the state of the first speaker 231 is determined to be in an abnormal state and the volume level of the audio signal output by the second speaker 232 is increased.

In the disclosure, the contents described with reference to FIG. 2 may be identically applied with respect to components having the same reference numerals as the electronic device 100 illustrated in FIG. 2.

Figure 3:
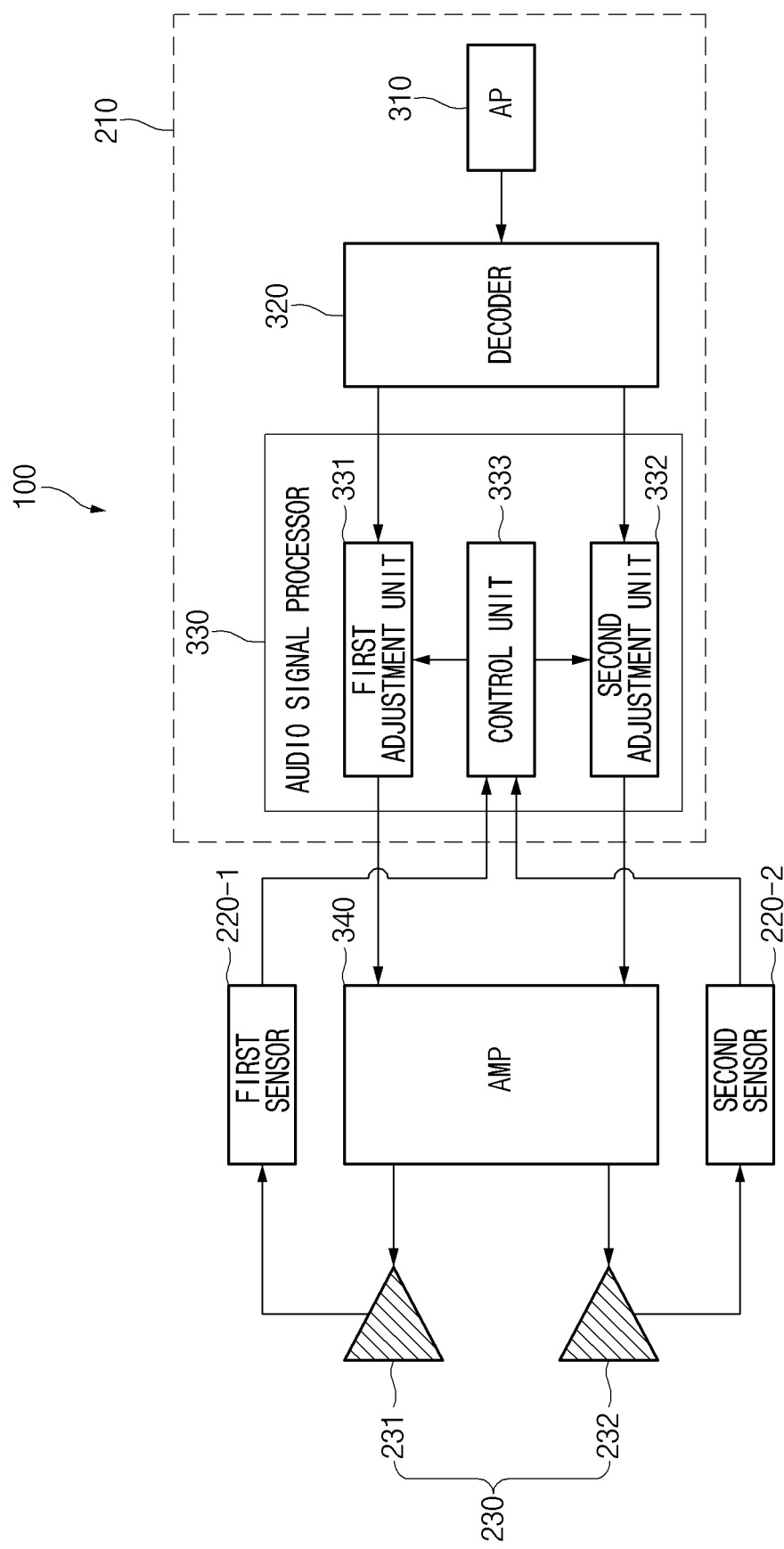
FIG. 3 illustrates a detailed block diagram of an electronic device including a plurality of speakers, according to an embodiment.

FIG. 3 illustrates a detailed block diagram of an electronic device including a plurality of speakers, according to an embodiment.

Referring to FIG. 3, the electronic device 100 may include the first speaker 231, the second speaker 232, a first sensor 220-1, a second sensor 220-2, an application processor (AP) 310 (e.g., the processor 210 in FIG. 2 or the processor 720 in FIG. 7), a decoder 320, an audio signal processor 330 (e.g., an audio signal processor 840 in FIG. 8), and an amplifier 340. According to various embodiments, some of the components 231, 232, 220-1, 220-2, 310, 320, 330 and 340 of the electronic device 100 may be omitted or components which are not illustrated in FIG. 3 may be further included. For example, the audio signal processor 330, the decoder 320 and/or the AP 310 may be implemented with the processor 210 described above with reference to FIG. 2. For another example, the decoder 320 may be implemented with software rather than a separate hardware configuration. Hereinafter, in the description of the electronic device 100 illustrated in FIG. 3, a description overlapping with the electronic device 100 illustrated in FIG. 2 may be omitted.

The first sensor 220-1 and the second sensor 220-2 may respectively detect the state of the first speaker 231 and the state of the second speaker 232. According to an embodiment, the first sensor 220-1 and the second sensor 220-2 may transfer detection results to the audio signal processor 330.

The AP 310 may transfer a compressed sound source to the decoder 320 to output an audio signal. The compressed sound source may be a sound source received from another module (e.g., a communication module) or stored in a memory (e.g., a memory 730 of FIG. 7).

The decoder 320 may decompress the compressed sound source received from the AP 310. In one embodiment, the decoder 320 may transmit the decompressed audio signal to the audio signal processor 330. According to an embodiment, the decoder 320 may be implemented with separate hardware or software executed by the AP 310.

The audio signal processor 330 may include a first adjustment unit 331, a second adjustment unit 332, and a control unit 333. According to an embodiment, the audio signal processor 330 may change characteristics of the audio signal received from the decoder 320. For example, the audio signal processor 330 may adjust a volume level of the audio signal through the first adjustment unit 331 and/or the second adjustment unit 332. For another example, the audio signal processor 330 may change frequency characteristics of the audio signal through the first adjustment unit 331 and/or the second adjustment unit 332.

According to an embodiment, audio signals input to the first adjustment unit 331 and the second adjustment unit 332 by the decoder 320 may be identical to each other. According to an embodiment, the first adjustment unit 331 and the second adjustment unit 332 may adjust signals to be output from the first speaker 231 and the second speaker 232, respectively. For example, the first adjustment unit 331 may increase a volume level of an audio signal received from the decoder 320 and transfer the audio signal to the first speaker 231, and the second adjustment unit 332 may decrease the volume level of the audio signal and transfer the audio signal to the second speaker 232.

According to one embodiment, the control unit 333 may receive a detection result from the first sensor 220-1 and/or the second sensor 220-2, and determine a state of the first speaker 231 and/or the second speaker 232 based on the detection result. The control unit 333 may control operations of the first adjustment unit 331 and the second adjustment unit 332 according to whether a speaker is abnormal. For example, when the state of the first speaker 231 is determined to be an abnormal state from the detection result of the first sensor 220-1, the control unit 333 may allow the first adjustment unit 331 to decrease a volume level of the audio signal output through the first speaker 231 and the second adjustment unit 332 to increase the volume level of the audio signal output through the second speaker 232.

According to one embodiment, when the control unit 333 increases the volume level of the audio signal based on the detection result received from the first sensor 220-1 and/or the second sensor 220-2, the control unit 333 may determine whether the state of the first speaker 231 or the state of the second speaker 232 is to be an abnormal state. For example, the control unit 333 may detect a temperature of the first speaker 231 and a temperature of the second speaker 232 through the first sensor 220-1 and the second sensor 220-2, and determine that the first speaker 231 is in an abnormal state according to the detected temperature. In this case, the control unit 333 may determine the risk of the second speaker 232 based on the detected temperature of the second speaker 232 before the control unit 333 decreases a volume level of an audio signal output from the first speaker 231 and increases a volume level of an audio signal output from the second speaker 232. In other words, the control unit 333 may predict a possibility that the second speaker 232 is in an abnormal state when increasing the volume level of the audio signal output from the second speaker 232 based on the detected temperature of the second speaker 232. For example, when it is determined that there is a high possibility that the second speaker 232 is in an abnormal state, the control unit 333 may perform control such that the volume level of the audio signal output from the second speaker 232 is maintained although the volume level of the audio signal output from the first speaker 231 is decreased.

According to an embodiment, the control unit 333 may allow the first adjustment unit 331 and the second adjustment unit 332 to change a frequency characteristic of the audio signal output from the speaker 230. For example, the control unit 333 may control the first adjustment unit 331 such that a low frequency band of the audio signal output from the first speaker 231 is emphasized. The first adjustment unit 331 may adjust the low frequency band of the audio signal output from the first speaker 231 to have a greater intensity than that of the high frequency band under the control of the control unit 333. For example, the first adjustment unit 331 may change the frequency characteristic of the audio signal through a low pass filter.

In an embodiment, when the audio signal output from the first speaker 231 is an audio signal in which a low frequency band is emphasized, and the state of the first speaker 231 is determined to be an abnormal state, the control unit 333 may decrease a volume level of the audio signal output from the first speaker 231 and increase the volume level of the audio signal output from the second speaker 232. In this case, the control unit 333 may control the second adjustment unit 332 such that the audio signal output from the second speaker 232 has a relatively larger increase in a signal in the low frequency band.

The amplifier 340 may convert a digital signal transmitted from the audio signal processor 330 into an analog signal, and amplify the signal at a specified ratio. The amplified signal may be transmitted to the first speaker 231 and the second speaker 232, and may be output through the first speaker 231 and the second speaker 232.

In the disclosure, the contents described with reference to FIG. 3 may be identically applied with respect to components having the same reference numerals as the electronic device 100 illustrated in FIG. 3.

Figure 4:
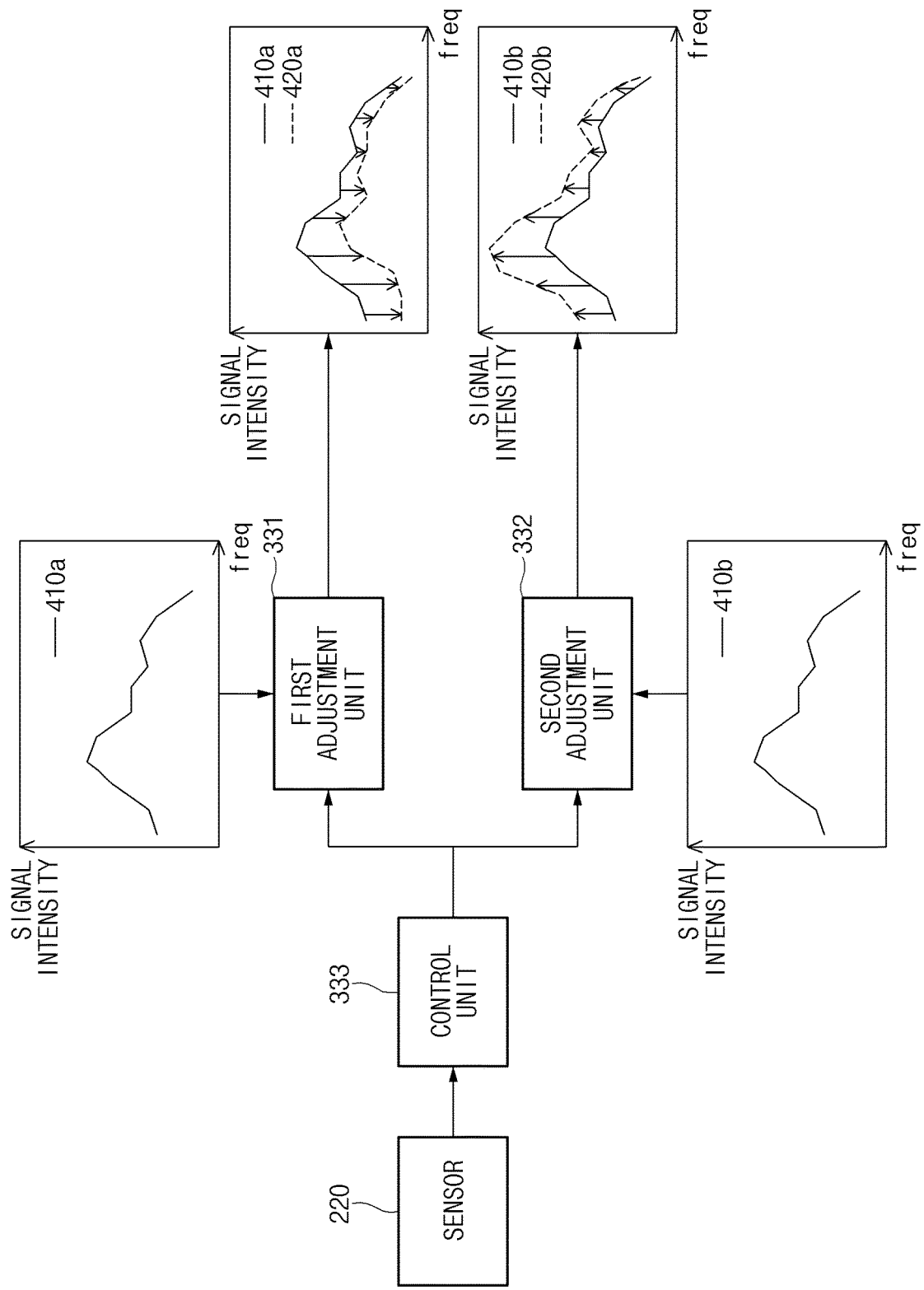
FIG. 4 illustrates a frequency characteristic of an audio signal whose volume level is adjusted in an electronic device, according to an embodiment.

FIG. 4 illustrates a frequency characteristic of an audio signal whose volume level is adjusted in an electronic device, according to an embodiment. In FIG. 4, an embodiment when risk of damage to the first speaker 231 (FIG. 3) is detected may be described Referring to FIG. 4, the sensor 220 may detect the state of the first speaker 231 and the state of the second speaker 232 (FIG. 3), and transfer the detection results to the control unit 333. According to an embodiment, the control unit 333 may determine that the state of the first speaker 231 is an abnormal state based on the detection result. In this case, the control unit 333 may allow the first adjustment unit 331 to decrease the volume level of the audio signal output from the first speaker 231. Alternatively, the control unit 333 may control the second adjustment unit 332 to increase the volume level of the audio signal output from the second speaker 232.

First graph 410*a* and second graph 410*b* may represent audio signals input to the first adjustment unit 331 and the second adjustment unit 332, respectively. The audio signals input to the first adjustment unit 331 and the second adjustment unit 332 may be identical to each other.

The first adjustment unit 331 may adjust a volume level of the audio signal output from the first speaker 231 to be decreased under the control of the control unit 333. Third graph 420*a* may represent an audio signal with a decreased volume level. When comparing third graph 420*a* with first graph 410*a*, it can be seen that the audio signals have different decrease widths according to the frequency bands because the audio signal is decreased at the same ratio in all frequency bands.

The second adjustment unit 332 may adjust the volume level of the audio signal output from the second speaker 232 to be increased under the control of the control unit 333. Fourth graph 420*b* may represent an audio signal with an increased volume level. When comparing fourth graph 420*b* with second graph 410*b*, it can be seen that the audio signals have different increase widths according to the frequency bands because the audio signal is increased at the same ratio in all frequency bands.

Referring to third graph 420*a* and fourth graph 420*b*, the volume level of the audio signal output from the first speaker 231 may have been decreased due to the risk of damage to the first speaker 231, but the volume level of the audio signal output from the second speaker 232 may have been increased, thus allowing the user to listen to sound of substantially the same magnitude.

Figure 5:
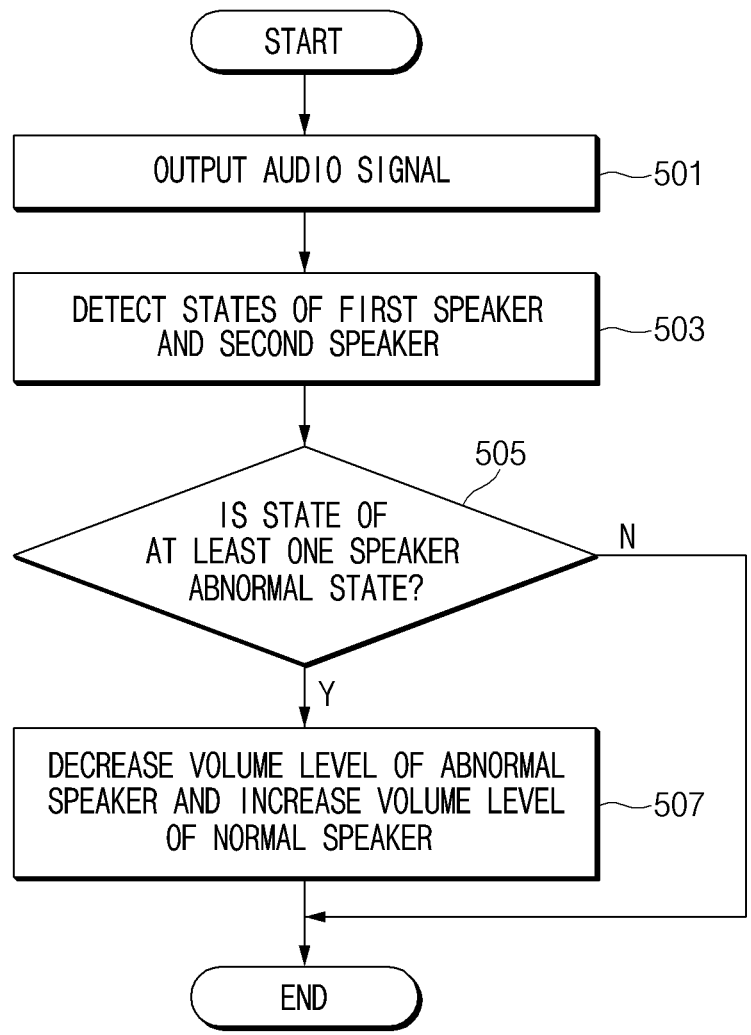
FIG. 5 is a flowchart of adjusting a volume level in an electronic device including a plurality of speakers according to an embodiment.

FIG. 5 is a flowchart of adjusting a volume level in an electronic device including a plurality of speakers according to an embodiment.

Referring to FIG. 5, operations of adjusting a volume level in an electronic device (e.g., 100 of FIG. 3) including a plurality of speakers may include operations 501 to 507. According to an embodiment, operations 501 to 507 may be performed by the electronic device 100 or a processor (e.g., 210 of FIG. 3). The electronic device 100 may include a plurality of speakers (e.g., 230 of FIG. 3). For example, the electronic device 100 may include two or more speakers. Hereinafter, the plurality of speakers 230 may include a first speaker (e.g., 231 of FIG. 3) and a second speaker (e.g., 232 of FIG. 3) in the description with reference to FIG. 5.

In operation 501, an audio signal may be output through the first speaker 231 and the second speaker 232. The audio signal may be input from the processor 210 to an audio module (e.g., an audio module 770 of FIG. 7). For example, an AP (e.g., the processor 210) may transfer a sound source stored in a memory (e.g., the memory 730 of FIG. 7), a sound source received from an external network through a communication module (e.g., the communication module 790 of FIG. 7) or the like to the audio module. The audio signal transferred from the processor 210 to the audio module may be output through the plurality of speakers 230. In various embodiments, the audio signal may have a volume level adjusted or a frequency characteristic changed.

In operation 503, states of the first speaker 231 and the second speaker 232 may be detected. A sensor (e.g., 220 in FIG. 2) may detect the voltage, current, impedance, and/or temperature of the speaker, and transmit the detection result to the processor 210.

In operation 505, the processor 210 may determine whether the states of the plurality of speakers 230 are normal or abnormal states based on the detection result in operation 503. For example, when the temperature of at least one speaker (e.g., the first speaker 231) exceeds a specified value, the processor 210 may determine that the speaker is in an abnormal state. As another example, when the impedance of at least one speaker (e.g., the first speaker 231) is greater than or equal to a specified value, the state of the speaker may be determined to be an abnormal state. When it is determined that the state of at least one of the plurality of speakers 230 is in an abnormal state, operation 507 is performed and when it is determined that all speakers are in a normal state, the operation may be ended.

In operation 507, as it is determined that the state of at least one speaker (e.g., the first speaker 231) is an abnormal state, the processor 210 may decrease the volume level of the speaker that is in the abnormal state and increase the volume level of another speaker (e.g., the second speaker 232) which is in a normal state. Through this, even when at least one speaker is in an abnormal state, the electronic device 100 may prevent a damage to the speaker and provide the user with substantially the same sound source.

Figure 6:
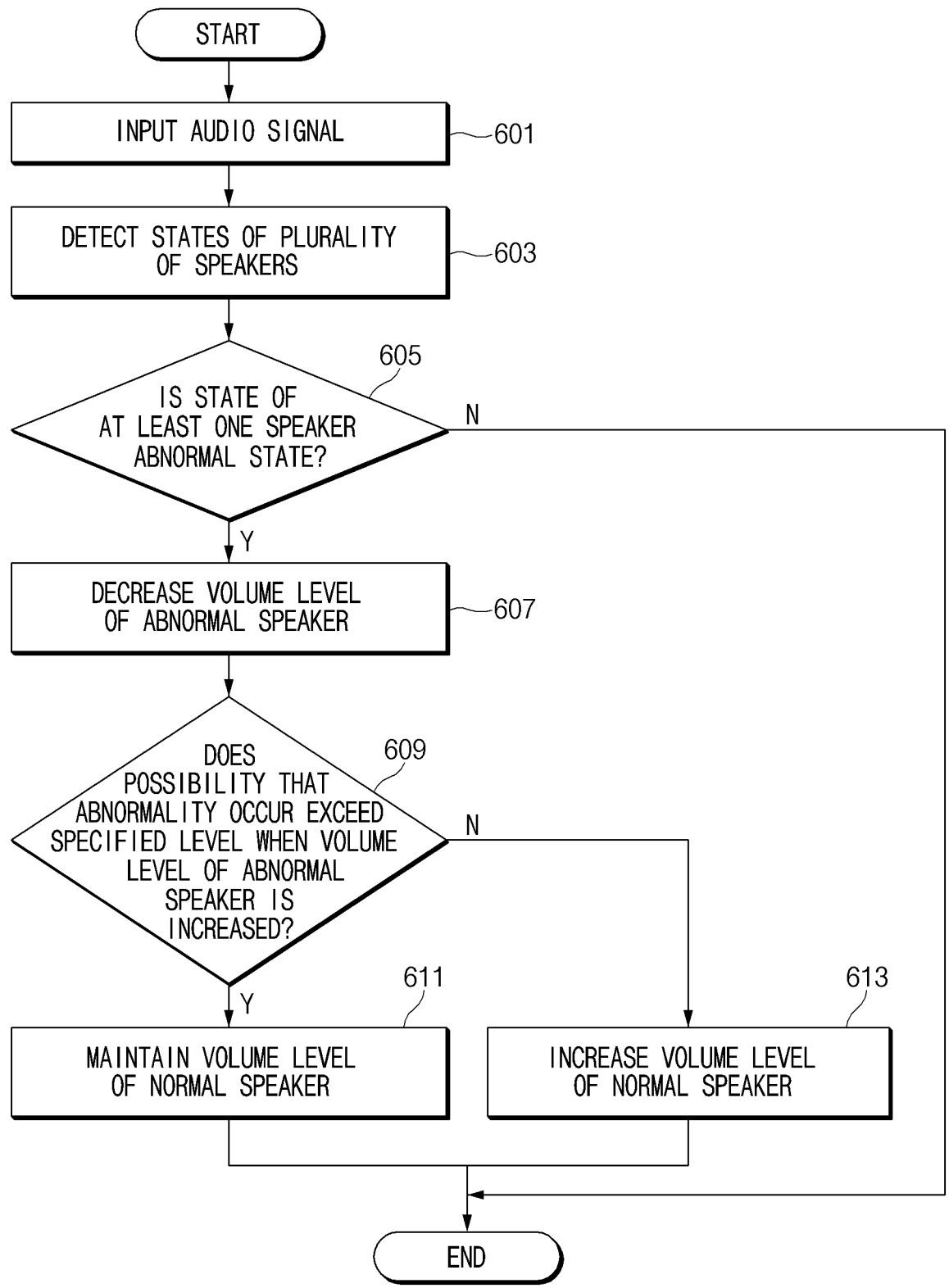
FIG. 6 illustrates a flowchart of adjusting a volume level in an electronic device including a plurality of speakers according to an embodiment.

FIG. 6 illustrates a flowchart of adjusting a volume level in an electronic device including a plurality of speakers according to an embodiment.

Referring to FIG. 6, operations of adjusting a volume level in an electronic device (e.g., 100 of FIG. 3) including a plurality of speakers (e.g., 230 of FIG. 3) may include operations 601 to 613. According to an embodiment, operations 601 to 613 may be performed by the electronic device 100 or the processor (e.g., 210 in FIG. 3).

Operations 601 and 603 may be the same operations as operations 501 and 503 illustrated in FIG. 5, respectively. Accordingly, descriptions of operations 501 and 503 of FIG. 5 may be referred to for descriptions of operations 601 and 603.

In operation 605, the processor 210 may determine whether the states of the plurality of speakers 230 are normal or abnormal states based on a detection result in operation 603. When it is determined that the state of at least one of the plurality of speakers 230 is in an abnormal state, operation 607 is performed and when it is determined that all speakers are in a normal state, operation 609 may be performed.

In operation 607, the processor 210 may decrease the volume level of the speaker which is in the abnormal state, as it is determined that the state of the at least one speaker is in an abnormal state.

In operation 609, when increasing the volume level of a normal speaker, the processor 210 may determine whether a possibility that the state of the normal speaker is an abnormal state exceeds a specified level. For example, when increasing the volume level of the audio signal output from the normal speaker based on the state (e.g., the temperature, the impedance, or the like) of the speaker detected in operation 603, the processor 210 may predict a possibility that the normal speaker be in an abnormal state. When it is determined that there is a high possibility that the normal speaker is in an abnormal state, operation 611 may be performed. Alternatively, when it is determined that there is a low possibility that the normal speaker is an abnormal state, operation 613 may be performed.

In operation 611, as it is determined that there is a high possibility that the normal speaker is in an abnormal state, the processor 210 may maintain the volume level of the normal speaker without increase in the volume level. Through this, the electronic device 100 may provide a specified sound source to the user without damage to the speaker 230.

In operation 613, as it is determined that there is a low possibility that that the normal speaker is in an abnormal state, the processor 210 may increase the volume level of the normal speaker. Through this, the electronic device 100 may provide substantially the same sound source to the user without damage to the speaker 230 even when at least one speaker 230 is in an abnormal state.

FIG. 7 is a block diagram of an electronic device in a network environment according to various embodiments.

Referring to FIG. 7, an electronic device 701 may communicate with an electronic device 702 through a first network 798 (e.g., a short-range wireless communication) or may communicate with an electronic device 704 or a server 708 through a second network 799 (e.g., a long-distance wireless communication) in a network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 may be a device for visually presenting information to the user and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

Figure 8:
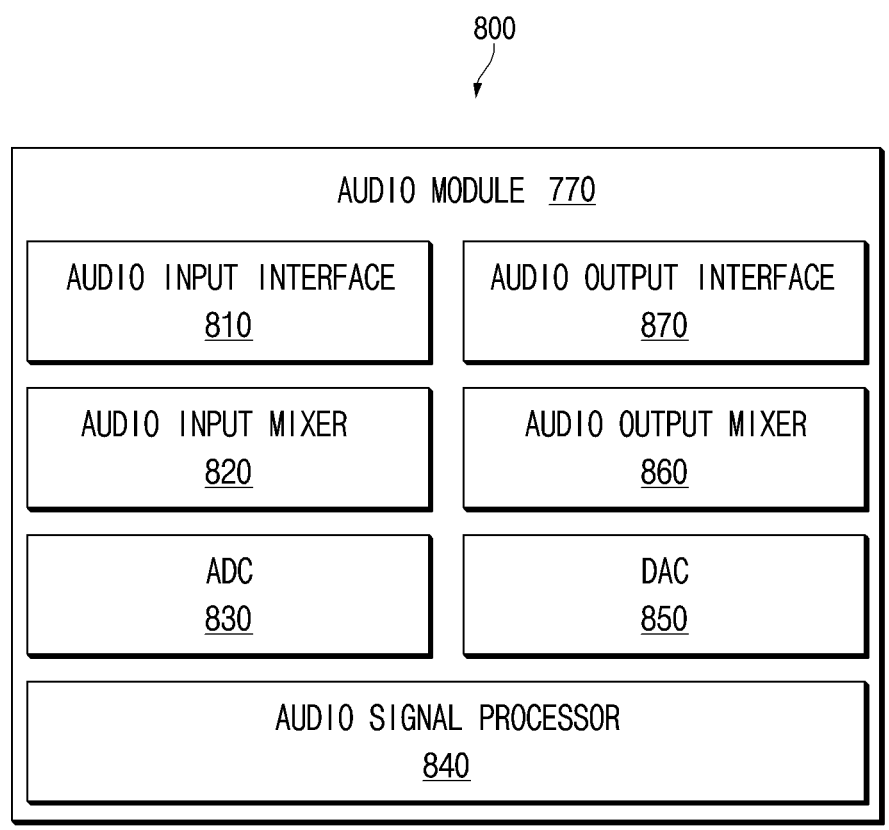
FIG. 8 is a block diagram of an audio module according to various embodiments

FIG. 8 is a block diagram of an audio module according to various embodiments.

Referring to FIG. 8, the audio module 770 may include, for example, an audio input interface 810, an audio input mixer 820, an analog to digital converter (ADC) 830, the audio signal processor 840, and a digital to analog converter (DAC) 850, an audio output mixer 860, or an audio output interface 870.

The audio input interface 810 may receive an audio signal corresponding to sound acquired from the outside of the electronic device 701 through a microphone (e.g., a dynamic microphone, a condenser microphone, or a piezo microphone) configured as a part of an input device (e.g., 750 in FIG. 7) or separately from the electronic device (e.g., 701 in FIG. 7). For example, when the audio signal is acquired from an external electronic device (e.g., 702 of FIG. 7) (e.g., a headset or a microphone), the audio input interface 810 may be connected to the external electronic device 702 via a connecting terminal (e.g., 778 of FIG. 7) wiredly or via a wireless communication module (e.g., 792 of FIG. 7) wirelessly (e.g., Bluetooth communication) to receive an audio signal. According to an embodiment, the audio input interface 810 may receive a control signal (e.g., a volume adjustment signal using an input button) related to an audio signal obtained from the external electronic device 702. The audio input interface 810 may include a plurality of audio input channels, and may receive different audio signals for audio input channels. According to one embodiment, additionally or alternatively, the audio input interface 810 may receive audio signals from other components of the electronic device 701 (e.g., the processor 720 of FIG. 7) or the memory 730 of FIG. 7).

The audio input mixer 820 may synthesize a plurality of input audio signals into at least one audio signal. According to an embodiment, the audio input mixer 820 may synthesize a plurality of analog audio signals input through the audio input interface 810 into at least one analog audio signal.

The ADC 830 may convert an analog audio signal to a digital audio signal. According to an embodiment, the ADC 830 may convert the analog audio signal received through the audio input interface 810, or additionally or alternatively, the analog audio signal synthesized through the audio input mixer 820 into a digital audio signal.

The audio signal processor 840 may perform various processes on a digital audio signal input through the ADC 830 or a digital audio signal received from another component of the electronic device 701. For example, the audio signal processor 840 may perform, on at least one or more digital audio signals, change of sampling rates, application of one or more filters, interpolation processing, amplification or attenuation processing, noise processing (e.g., attenuation of noise or echo), channel switching (e.g., switching between mono and stereo), mixing, or extraction of a specified signal. According to an embodiment, at least some functions of the audio signal processor 840 may be implemented in the form of an equalizer.

The DAC 850 may convert a digital audio signal into an analog audio signal. According to an embodiment, the DAC 850 may convert a digital audio signal processed by the audio signal processor 840 or a digital audio signal acquired from another component of the electronic device 701 into an analog audio signal.

The audio output mixer 860 may synthesize a plurality of audio signals to be output into at least one audio signal. According to an embodiment, the audio output mixer 860 may synthesize an analog audio signal, which has been converted through the DAC 850, and another analog audio signal (e.g., an analog audio signal received through the audio input interface 810) into at least one analog audio signal.

The audio output interface 870 may output the analog audio signal converted through the DAC 850 and additionally or alternatively, the analog audio signal synthesized by the audio output mixer 860 to the outside of the electronic device 701 through a sound output device (e.g., 755 of FIG. 7) (e.g., a speaker (e.g., a dynamic driver or a balanced armature driver) or a receiver).

According to an embodiment, the sound output device 755 may include a plurality of speakers, and the audio output interface 870 may output an audio signal having a plurality of different channels (e.g., stereo or 5.1 channel) through at least some of the plurality of speakers. According to an embodiment, the audio output interface 870 may be connected to the external electronic device 702 (e.g., an external speaker or a headset) via the connecting terminal 778 wiredly, or via the wireless communication module 792 wirelessly to output the audio signal.

According to one embodiment, the audio module 770 may synthesize a plurality of digital audio signals to generate at least one digital audio signal as at least some functions of the audio signal processor 840 without separately including the audio input mixer 820 or the audio output mixer 860.

According to an embodiment, the audio module 770 may include an audio amplifier (not shown) (e.g., a speaker amplification circuit) capable of amplifying an analog audio signal input through the audio input interface 810 or an audio signal to be output through the audio output interface 870. According to an embodiment, the audio amplifier may be configured as a separate module from the audio module 770.

According to various embodiments disclosed herein, even when the volume levels of some speakers included in the electronic device 100 are decreased, the user may hear a sound source having substantially the same magnitude (or volume level). In addition, in a case where sound sources having different frequency characteristics are output from speakers, even when the volume levels of some speakers are decreased, the user may listen to sound sources having substantially the same frequency characteristics. Through this, a sound source provider may provide the sound source to the user in the manner originally intended by the sound source provider, and the user's listening environment may be maintained at a specified level or more thus satisfying the user's experience and needs.

According to an embodiment of the disclosure, an electronic device may include a first speaker, a second speaker, at least one sensor that detects a state of at least one of the first speaker and the second speaker and at least one processor electrically connected to the first speaker, the second speaker and the at least one sensor, wherein the at least one processor may output an audio signal through the first speaker and the second speaker, identify states of the first speaker and the second speaker by using the at least one sensor, and decrease a volume level of an audio signal output by the first speaker and increase a volume level of an audio signal output by the second speaker when it is determined that the state of the first speaker is an abnormal state.

According to an embodiment, the first speaker may output a first audio signal having a first frequency characteristic, and the second speaker may output a second audio signal having a second frequency characteristic, and the at least one processor may increase a volume level of the second audio signal based on the first frequency characteristic of the first audio signal which is decreased.

According to an embodiment, the first audio signal may have the first frequency characteristic in which an intensity of a signal in a specified low frequency band is greater than an intensity of a signal in a specified high frequency band and the at least one processor may increase the volume level of the second audio signal by assigning a greater weight to the specified low frequency band than the specified high frequency band.

According to an embodiment, the first audio signal may have the first frequency characteristic in which an intensity of a signal in a specified high frequency band is greater than an intensity of a signal in a specified low frequency band, and the at least one processor may increase the volume level of the second audio signal by assigning a greater weight to the specified high frequency band than the specified low frequency band.

According to an embodiment, the at least one sensor may include a first sensor and a second sensor, the first sensor may detect the state of the first speaker, and the second sensor may detect the state of the second speaker.

According to an embodiment, the at least one processor may acquire sensing data related to temperatures of the first speaker and the second speaker using the at least one sensor as a part of an operation of identifying the states of the first speaker and the second speaker.

According to an embodiment, the at least one processor may determine that a state of the first speaker is the abnormal state when a temperature of the first speaker exceeds a specified value based at least on the sensing data.

According to an embodiment, the at least one processor may acquire sensing data related to impedances of the first speaker and the second speaker using the at least one sensor as a part of an operation of identifying the states of the first speaker and the second speaker.

According to an embodiment, the at least one processor may determine that a state of the first speaker is the abnormal state when an impedance of the first speaker is greater than or equal to a specified value based at least on the sensing data.

According to an embodiment, the at least one processor may decrease a volume level of an audio signal output by the first speaker and increase a volume level of an audio signal output by the second speaker when it is determined that the state of the second speaker is a normal state although a volume level of an audio signal output by the second speaker is increased.

According to an embodiment, the at least one processor may maintain a volume level of an audio signal output by the first speaker and increase a volume level of an audio signal output by the second speaker when it is determined that the state of the second speaker is to be an abnormal state in a case in which a volume level of an audio signal output by the second speaker is increased.

According to an embodiment, the at least one processor may perform an operation of identifying the states of the first speaker and the second speaker at a specified time interval.

According to an embodiment, the at least one processor may determine at least one speaker of which a volume level exceeds a specified level among the first speaker and the second speaker, and detect a state of the determined at least one speaker at a time interval shorter than the specified time interval.

According to an embodiment, the at least one processor may detect the state of the at least one of the first speaker and the second speaker at a time interval longer than the specified time interval when volume levels of the first speaker and the second speaker are lower than a specified level.

According to an embodiment, the at least one processor may decrease a volume level of an audio signal output by the first speaker at the same ratio in all frequency bands and increase a volume level of an audio signal output by the second speaker at the same ratio in all frequency bands.

According to an embodiment disclosed in the disclosure, a method of outputting an audio signal in an electronic device may include outputting an audio signal through a plurality of speakers, detecting states of the plurality of speakers, determining at least one speaker specifying a specified condition among the plurality of speakers based on the detected states, decreasing a volume level of an audio signal output by the determined at least one speaker of the plurality of speakers and increasing a volume level of an audio signal output by another speaker other than the determined at least one speaker.

According to an embodiment, the audio signal output by the at least one speaker may have a frequency characteristic in which an intensity of a signal in a first frequency band is greater than an intensity of a signal in a second frequency band.

According to an embodiment, the increasing of the volume level of the audio signal output by the another speaker may include increasing of the volume level of the audio signal by assigning a greater weight to the first frequency band than the second frequency band based on the frequency characteristic.

According to an embodiment, the determining of the at least one speaker satisfying the specified condition may include identifying temperatures of the plurality of speakers as at least some of the states of the plurality of speakers and determining that the specified condition is satisfied when the temperature exceeds a specified temperature.

According to an embodiment, the detecting of the states of the plurality of speakers may include determining at least one speaker of which a volume level exceeds a specified level among the plurality of speakers and detecting the state of the determined at least one speaker at a time interval shorter than a specified time interval.

According to an embodiment, the detecting of the states of the plurality of speakers may include determining at least one speaker of which a volume level is lower than a specified level among the plurality of speakers and detecting the state of the determined at least one speaker at a time interval longer than a specified time interval.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device comprising:
a first speaker;
a second speaker;
at least one sensor configured to detect a state of at least one of the first speaker and the second speaker; and
at least one processor electrically connected to the first speaker, the second speaker and the at least one sensor,
wherein the at least one processor is configured to:
output an audio signal through the first speaker and the second speaker,
identify states of the first speaker and the second speaker by using the at least one sensor, and
decrease a volume level of the audio signal output by the first speaker and increase a volume level of the audio signal output by the second speaker when it is determined that the state of the first speaker is an abnormal state,
wherein the at least one processor is configured to determine the state of the first speaker as the abnormal state based on a temperature of the first speaker exceeding a specified value or an impedance of the first speaker being equal to or greater than a specified value.

2. The electronic device of claim 1, wherein the first speaker outputs a first audio signal having a first frequency characteristic, and the second speaker outputs a second audio signal having a second frequency characteristic, and
wherein the at least one processor is configured to increase a volume level of the second audio signal based on the first frequency characteristic of the first audio signal which is decreased.

3. The electronic device of claim 2, wherein the first audio signal has the first frequency characteristic in which an intensity of a signal in a specified low frequency band is greater than an intensity of a signal in a specified high frequency band, and
wherein the at least one processor is configured to increase the volume level of the second audio signal by assigning a greater weight to the specified low frequency band than the specified high frequency band.

4. The electronic device of claim 2, wherein the first audio signal has the first frequency characteristic in which an intensity of a signal in a specified high frequency band is greater than an intensity of a signal in a specified low frequency band, and wherein the at least one processor is configured to increase the volume level of the second audio signal by assigning a greater weight to the specified high frequency band than the specified low frequency band.

5. The electronic device of claim 1, wherein the at least one sensor includes a first sensor and a second sensor, wherein the first sensor detects the state of the first speaker, and wherein the second sensor detects the state of the second speaker.

6. The electronic device of claim 1, wherein the at least one processor is configured to acquire sensing data related to temperatures of the first speaker and the second speaker using the at least one sensor as a part of an operation of identifying the states of the first speaker and the second speaker.

7. The electronic device of claim 6, wherein the at least one processor is configured to determine that a state of the first speaker is the abnormal state when the temperature of the first speaker exceeds the specified value based at least on the sensing data.

8. The electronic device of claim 1, wherein the at least one processor is configured to acquire sensing data related to impedances of the first speaker and the second speaker using the at least one sensor as a part of an operation of identifying the states of the first speaker and the second speaker.

9. The electronic device of claim 8, wherein the at least one processor is configured to determine that a state of the first speaker is the abnormal state when the impedance of the first speaker is greater than or equal to the specified value based at least on the sensing data.

10. The electronic device of claim 1, wherein the at least one processor is configured to decrease a volume level of an audio signal output by the first speaker and increase a volume level of an audio signal output by the second speaker when it is determined that the state of the second speaker is a normal state although a volume level of an audio signal output by the second speaker is increased.

11. The electronic device of claim 1, wherein the at least one processor is configured to maintain the volume level of the audio signal output by the first speaker and increase the volume level of the audio signal output by the second speaker when it is determined that the state of the second speaker is to be an abnormal state in a case in which the volume level of the audio signal output by the second speaker is increased.

12. The electronic device of claim 1, wherein the at least one processor is configured to perform an operation of identifying the states of the first speaker and the second speaker at a specified time interval.

13. The electronic device of claim 12, wherein the at least one processor is configured to:

determine at least one speaker of which a volume level exceeds a specified level among the first speaker and the second speaker, and detect a state of the determined at least one speaker at a time interval shorter than the specified time interval.

14. The electronic device of claim 12, wherein the at least one processor is configured to detect the state of the at least one of the first speaker and the second speaker at a time interval longer than the specified time interval when volume levels of the first speaker and the second speaker are lower than a specified level.

15. The electronic device of claim 1, wherein the at least one processor is configured to decrease the volume level of the audio signal output by the first speaker at the same ratio in all frequency bands and increase the volume level of the audio signal output by the second speaker at the same ratio in all frequency bands.

* * * * *